United States Patent [19]
Schuler

[11] Patent Number: 5,319,276
[45] Date of Patent: Jun. 7, 1994

[54] CORONA-SHIELDING ARRANGEMENT FOR THE STATOR WINDING OF AN ELECTRIC MACHINE

[75] Inventor: Roland Schuler, Wettingen, Switzerland

[73] Assignee: Asea Brown Boveri Ltd., Baden, Switzerland

[21] Appl. No.: 52,992

[22] Filed: Apr. 27, 1993

[30] Foreign Application Priority Data

Jun. 10, 1992 [DE] Fed. Rep. of Germany ....... 4218928

[51] Int. Cl.5 .............................................. H02K 1/00
[52] U.S. Cl. ................................................. 310/196
[58] Field of Search .................. 310/43, 45, 196, 201, 310/208, 211, 214, 215, 216, 254, 258

[56] References Cited

U.S. PATENT DOCUMENTS

| | | | |
|---|---|---|---|
| 2,613,238 | 10/1952 | Wieseman | 310/196 |
| 3,723,797 | 3/1973 | Andersson et al. | 310/196 |
| 3,824,683 | 7/1974 | Rhudy | 310/45 |
| 3,891,880 | 6/1975 | Britsch | 310/196 |
| 4,388,546 | 6/1983 | Schwanzer | 310/196 |
| 4,831,303 | 5/1989 | Rowe et al. | 310/45 |

FOREIGN PATENT DOCUMENTS

| | | | |
|---|---|---|---|
| 444592 | 3/1927 | Fed. Rep. of Germany | 310/196 |
| 1900679 | 7/1970 | Fed. Rep. of Germany | 310/196 |
| 356192 | 9/1961 | Switzerland | 310/196 |
| 977756 | 12/1964 | United Kingdom | 310/196 |

OTHER PUBLICATIONS

Sequenz, H.; u.a.: Herstellung der Wicklungen elektrischer Maschinen, Springer Verlag Wien. 1973, S. 156–158.
Patent Abstracts of Japan, JP 54-65303 A., E-125 Jul. 24, 1979, vol. 3, No. 86. K. Kadotani, "Stator Coil for Rotary Electric Machine."

*Primary Examiner*—Steven L. Stephan
*Assistant Examiner*—Matthew Nguyen
*Attorney, Agent, or Firm*—Oblon, Spivak, McClelland, Maier & Neustadt

[57] ABSTRACT

The corona-shielding arrangement for the stator winding of an electric machine, comprising a semiconductive textile corona-shielding strip wound around the major insulation of slot portion and end yoke portion of each bar of the stator winding is constructed such that the slot portion (10) of the stator winding bar is wound around in at least one layer with a first semiconductive, volume-conducting coronashielding strip (24) having an approximately constant degree of overlap. The end yoke portion is wound around in at least one layer with a second semiconductive, volume-conducting corona-shielding strip (24), the degree of overlap from the exit of the bar from the stator body (14) to the bar end becoming continuously smaller. This corona-shielding arrangement is economic to produce; the voltage characteristic in the longitudinal direction of the bar is simple to optimize.

10 Claims, 1 Drawing Sheet

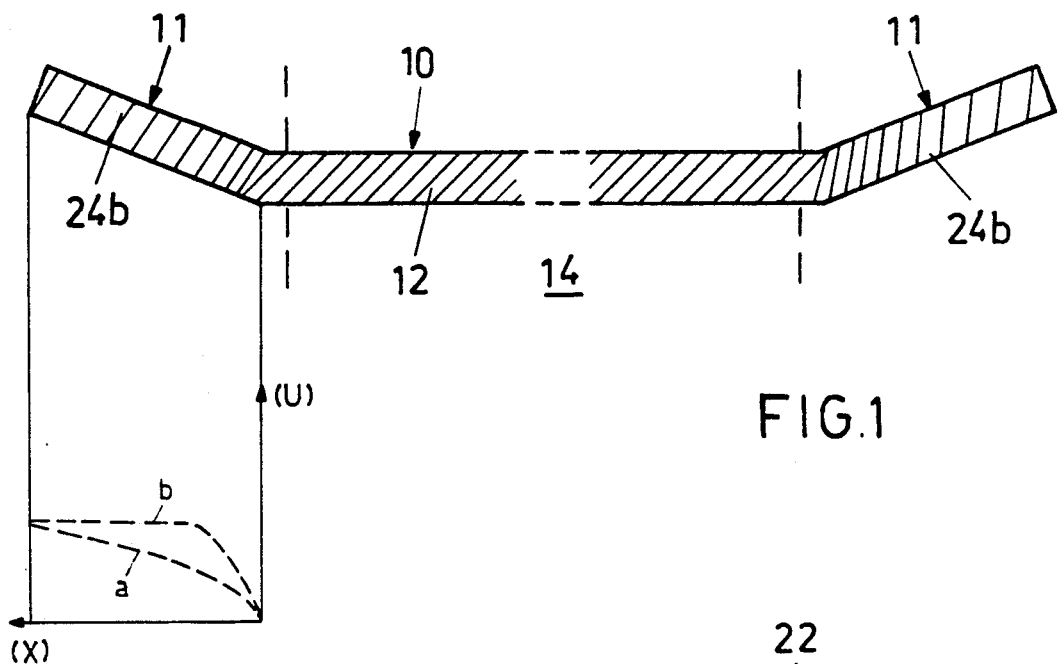
FIG.1
FIG.3
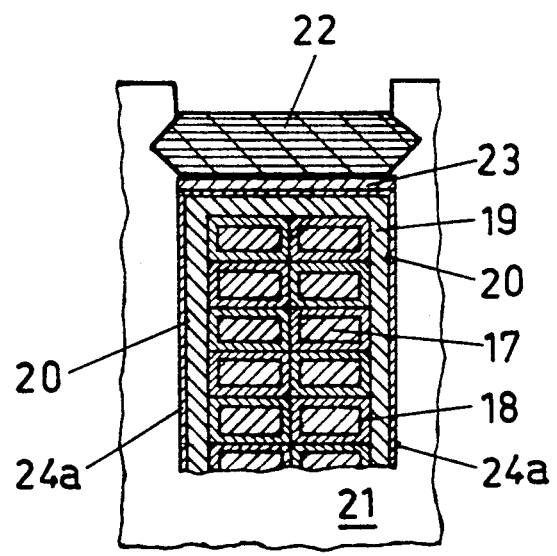
FIG.2

CORONA-SHIELDING ARRANGEMENT FOR THE STATOR WINDING OF AN ELECTRIC MACHINE

BACKGROUND OF THE INVENTION

1. Field of the Invention

The invention relates to a corona-shielding arrangement for the stator winding of an electric machine, comprising a semiconductive textile coronashielding strip wound around the major or main insulation of the slot portion and end yoke portion of each bar of the stator winding.

2. Discussion of Background

The stator winding conductors of rotating electric machines, which are already provided over their entire length with the major or main insulation, are provided in the slot portion with coil-side corona shielding. Nowadays, the latter generally consists of a semiconductive nonwoven or fabric already applied during the insulating operation. The coil-side corona shielding must be led out so far beyond the laminate stack length that no discharges can occur even given small distances with respect to the pressure plates and pressure fingers of the laminate stack.

In machines having relatively high nominal voltages (5 kvolts and higher), overhang corona shielding adjoins the coil-side corona shielding. This overhang corona shielding ensures that the decrease in potential along the conductor takes place towards the grounded laminate stack without the possibility of creeping or glow discharges. The overhang corona shielding must be calculated and designed not only for the operating stress, but also, above all, for the test voltages to be applied for monitoring the production quality. A specific insulation length is required for the voltage reduction by means of such overhang corona shielding. In the case of insulations which have an adequate dielectric strength only in the slot portion, the straight overhang projection must therefore be sufficiently long to control the voltages. Continuous insulations, by contrast, can be designed such that the corona-shielding arrangement can also be applied in the involute directly adjoining the slot portion. This permits a desired relatively short overhang projection, but also requires the full insulation thickness up to the end of the corona shielding. Either surface coatings in the form of paint finishes or semiconductive strips having a specific conductivity value are applied for the purpose of voltage control (cf. the series "Herstellung der Wicklungen elektrischer Maschinen" ["Production of the Windings of Electric Machines"], Springer-Verlag, Vienna - N.Y., 1973, pages 156 to 158). If it is desired in this case to achieve as linear as possible a voltage characteristic over the length of the winding overhang conductor, problems arise in the use of semiconductive paint finishes, because such paint finishes essentially have only a surface conductivity. The relevant literature throws no light on how the voltage characteristic can be matched/optimized in the case of the use of semiconductive strips.

SUMMARY OF THE INVENTION

Accordingly, one object of this invention is to provide, starting from the prior art, a novel corona-shielding arrangement for the stator winding of an electric machine which is simple to apply and by means of which the voltage characteristic in the winding overhang portion of the bars can be influenced and optimized in a simple way.

According to the invention, this object is achieved when the slot portion of the stator winding bar is wound around in at least one layer with a semiconductive, volume-conducting corona-shielding strip having an approximately constant degree of overlap, and the end yoke portion is wound around in at least one layer with a semiconductive, volume-conducting corona-shielding strip, the degree of overlap from the exit of the bar from the stator laminate body to the bar end being smaller continuously or in sections.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein an exemplary embodiment of the invention is represented in a diagrammatic representation, and:

FIG. 1 shows the top view of a bar half of a stator winding, constructed from Roebel bars, of an electric machine;

FIG. 2 shows a cross section through a stator slot with inserted bar; and

FIG. 3 shows a diagram to illustrate the voltage characteristic along the end yoke of the bar.

DESCRIPTION OF THE PREFERRED EMBODIMENTS

Referring now to the drawings, wherein like reference numerals designate identical or corresponding parts throughout the several views, a stator bar of an electric machine in accordance with FIG. 1 has in the slot region a straight bar section 10 and in the winding overhang region or end yoke portion a bent bar section 11. The straight bar section 10 overhangs the stator body 14. The bar is provided over its entire length with an insulation, which is designated in general by the reference numeral 12 and is surrounded by a corona-shielding strip which is the subject matter of the present invention.

As emerges from the cross section in accordance with FIG. 2, the bar is constructed from a multiplicity of mutually insulated component conductors 17 which are tested in accordance with the Roebel principle. Each component conductor has a component conductor insulation 18 of known design. The component conductors 17 are combined to form a conductor bundle, are surrounded by a common insulating sleeve, the major or main insulation 12, and are situated in a stator slot 20 in the laminate stack 21 of the machine. Fixing of the bar is performed by means of slot wedges 22 and wedge supports 23. The major insulation 19 is surrounded by a corona-shielding strip 24a which is wound around the conductor bar in one or more layers.

This corona-shielding strip 24a is applied in the straight bar section 10 with a uniform overlap, recognizable in the uniform spacing of the hatched lines. By contrast, in the end yoke portion 11 the degree of overlap of the corona-shielding strip 24b varies in such a way that there is a larger degree of overlap in the region of the stator body side than at the bar end. In this case, the degree of overlap preferably varies continuously over the bar length in the end yoke portion, recognizable in the spacing of the hatched lines which becomes greater towards the bar end in FIG. 1. However, it is also possible for there to be a sequence of a plurality of sections which have a constant degree of overlap in sections.

The corona-shielding strip 24a, 24b consists of a textile backing, preferably of a glass fiber fabric which is impregnated with a semiconductive impregnant, for example with carbon black, graphite or epoxy resin filled with silicon carbide.

It is possible in principle to use the same corona-shielding strips for the slot and end yoke portions, although it is to be recommended to use different types of strip in the slot and yoke portions. Thus, use is made in the slot portion 10 of strips having a low resistance (for example filler of graphite and/or carbon black), and in the yoke portion of strips having a higher, mostly voltage-dependent resistance (for example filler SiC), in order to achieve the desired efficiency of the corona-shielding.

A single layer of corona-shielding strip 24b in the yoke portion 11 is normally sufficient. In the case, in particular, of bars having a small overhang projection in the yoke portion 11, it can be expedient to provide a plurality of layers of corona-shielding strip 24b one above another. It holds for this case, as well, that in each layer the degree of overlap then either decreases continuously or in sections towards the bar end.

In the diagram in accordance with FIG. 3, the voltage characteristic of a bar provided with the corona-shielding arrangement according to the invention (curve a) is illustrated in comparison with a conventional design (curve b). The flattening of the voltage characteristic, which approximates the ideal (straight line), is clearly in evidence. The result of this is a more uniform loading of the bar insulation and an increase in the service life of the winding.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. A corona-shielding arrangement for the stator winding of an electric machine in which a stator bar includes a slot portion and an end yoke portion, said end yoke portion including a first end adjacent said slot portion and a second end disposed away from said slot portion, with a main insulation provided about the stator bar, the corona-shielding arrangement comprising at least one semiconductive textile corona-shielding strip wound around the main insulation of the slot portion and the end yoke portion, wherein the slot portion is wound with at least one layer of a semiconductive, volume-conducting corona-shielding strip having a virtually constant degree of overlap, and the end yoke portion is wound with at least one layer of a semiconductive, volume-conducting corona-shielding strip, and wherein a degree of overlap of the corona-shielding strip of said end yoke portion decreases from said first end to said second end of said end yoke portion.

2. The corona-shielding arrangement as claimed in claim 1, wherein the corona-shielding strip has a textile backing made from glass fabric and impregnated with a semiconductive impregnant.

3. The corona-shielding arrangement as claimed in claim 2, wherein in the corona-shielding strip in the slot portion the impregnant contains carbon black and/or graphite.

4. The corona-shielding arrangement as claimed in claim 2 or 3, wherein in the corona-shielding strip in the end yoke portion the impregnant has a voltage-dependent resistance characteristic and preferably consists of epoxy resin filled with silicon carbide.

5. The corona-shielding arrangement as claimed in claim 1, wherein in the end yoke portion a plurality of layers of corona-shielding strips with different degrees of overlap are provided.

6. The corona-shielding arrangement of claim 1, wherein a continuously decreasing degree of overlap of the corona-shielding strip is provided along at least a part of said end yoke portion extending in a direction from said first end to said second end of said end yoke portion.

7. The corona-shielding arrangement of claim 1, wherein a plurality of sections are provided, each having differing degrees of overlap of the corona-shielding strip on said end yoke portion, wherein one of said sections is disposed closer to said first end relative to another of said plurality of sections, and wherein said one section includes a higher degree of overlap of said corona-shielding strip as compared with said another section.

8. A corona-shielding arrangement for a stator winding of an electric machine in which a stator bar includes a slot portion and an end yoke portion, said end yoke portion including a first end adjacent said slot portion and a second end disposed away from said slot portion, and wherein a main insulation is provided about said stator bar, the corona-shielding arrangement comprising a semiconductive, volume-conducting corona-shielding strip wound around the main insulation of the slot portion, and further wherein a semiconductive volume-conducting corona-shielding strip is wound around said end yoke portion in overlapping relation such that a degree of overlap in said end yoke portion at a first location is greater than a degree of overlap at a second location, and wherein said first location is closer to said first end of said end yoke portion than said second location.

9. The corona-shielding arrangement of claim 8, wherein said semiconductive, volume-conducting corona-shielding strip wound around said slot portion is wound in overlapping relation having a substantially constant degree of overlap along at least a majority of said slot portion.

10. The corona-shielding arrangement of claim, 8 wherein a first type of corona-shielding strip is provided about said slot portion, and a different second type of corona-shielding strip is provided about said end yoke portion.

* * * * *